United States Patent
Iyoshi et al.

(10) Patent No.: US 6,572,142 B1
(45) Date of Patent: Jun. 3, 2003

(54) AIR BAG GAS INFLATOR

(75) Inventors: Shuso Iyoshi, Hyogo (JP); Mithuhiko Fukabori, Hyogo (JP)

(73) Assignee: Daicel Chemical Industries, Ltd., Osaka (JP)

( * ) Notice: Subject to any disclaimer, the term of this patent is extended or adjusted under 35 U.S.C. 154(b) by 0 days.

(21) Appl. No.: 09/133,953

(22) Filed: Aug. 14, 1998

(51) Int. Cl.[7] ............................................... B60R 21/26
(52) U.S. Cl. ...................................... 280/737; 280/741
(58) Field of Search ............................... 280/737, 736, 280/741; 102/530, 531

(56) References Cited

U.S. PATENT DOCUMENTS

| | | |
|---|---|---|
| 3,773,353 A | 11/1973 | Trowbridge et al. |
| 3,868,124 A | 2/1975 | Johnson |
| 3,905,515 A * | 9/1975 | Allemann .................... 280/737 |
| 3,961,806 A * | 6/1976 | Katter ......................... 280/737 |
| 3,966,226 A | 6/1976 | Roth |
| 5,142,982 A * | 9/1992 | Diepold et al. ............. 102/530 |
| 5,553,889 A | 9/1996 | Hamilton et al. |
| 5,556,132 A * | 9/1996 | Sampson .................... 280/741 |
| 5,558,367 A * | 9/1996 | Cuevas ....................... 280/737 |
| 5,630,618 A * | 5/1997 | Hamilton et al. ........... 280/737 |
| 5,630,619 A * | 5/1997 | Buchanan et al. .......... 280/737 |
| 5,794,973 A * | 8/1998 | O'Loughlin et al. ....... 280/737 |
| 5,803,494 A * | 9/1998 | Headley ...................... 280/737 |
| 5,851,027 A * | 12/1998 | DiGiacomo et al. ........ 280/736 |
| 5,887,893 A * | 3/1999 | Lang et al. .................. 280/741 |

FOREIGN PATENT DOCUMENTS

| | | |
|---|---|---|
| EP | 0382552 A2 | 8/1990 |
| GB | 1430258 A | 3/1976 |
| JP | 4933320 A2 | 3/1974 |

* cited by examiner

Primary Examiner—Peter C. English
(74) Attorney, Agent, or Firm—Birch, Stewart, Kolasch & Birch, LLP

(57) ABSTRACT

A gas generator for an air bag that can change the inflating (deploying) speed of the air bag is provided. The gas generator includes a vessel having a pressurized gas accommodation chamber for accommodating pressurized gas therein, a partition that divides the pressurized gas accommodation chamber into two sections, and a through-hole which is defined in the partition, for communicating the two sections. The gas generator also includes two ignition units containing gas generating agents therein, and a gas release unit disposed in the pressurized gas accommodation chamber and having a rupturable gas sealing wall. A single ignition unit can be disposed in each section or two ignition units can be disposed in one of the two sections.

9 Claims, 4 Drawing Sheets

AIR BAG GAS INFLATOR

BACKGROUND OF THE INVENTION

1. Technical Field

The present invention relates to a gas generator for an air bag that protects a driver or a passenger from an impact, and more particularly to a hybrid-type gas generator that seals pressurized gas therein.

2. Description of the Prior Art

For the purpose of protecting a driver or passenger from an impact, a vehicle is equipped with an air bag device. The air bag device includes a sensor, a control unit, gas generator, an air bag, etc. The gas generator includes ignition means and gas generating means.

Upon detection of an impact by the sensor, a detection signal is supplied to a control unit, which conducts arithmetic calculation in response to the detection signal. The control unit sends an output signal representative of the result of the arithmetic calculation to the ignition means. The ignition means is thus operated. By this operation, a gas is generated abruptly and provided into the air bag (bag body). As a result, the air bag is inflated and forms a cushion that absorbs an impact between a solid structure of the vehicle and the driver or the passenger.

Although there are numerous combinations of vehicle speed and seating posture of passengers at the time of a collision, most of the current air bag devices merely deploy the bag by generating the gas all at once upon receiving a signal from a shock sensor. Therefore, an excessive force, due to the deployment of the bag, may be applied to the passengers. There are number of inventions, in which, for example, reduces such a force from being applied to the passengers when the passengers are not seated in a proper posture.

In Japanese laid-open application No. 49-33320, a plurality of igniters are activated by a low-speed shock sensor and a high-speed shock sensor, respectively, such that the force of deployment of the bag can be selected in accordance with the shock due to the collision of the vehicle.

By this method, however, although the deployment force of the bag can be selected in accordance with the extent of the shock applied to the vehicle, the deployment of the bag cannot be selected in accordance with the seating posture of the passengers.

Further, EP-0382552 teaches a gas generator device having a vessel with two completely independent and isolated chambers, defined by a partition wall, in which an igniter and a gas generating material are disposed, and an ignition system for the same. This conventional art teaches adjusting the forces of air bag deployment by providing a combination of sensors for detecting a shock applied to the vehicle, vehicle speed, and atmospheric temperature. The structure of this gas generator device, however, is very complicated and includes many parts. Therefore, it is very difficult to manufacture and to maintain reliability.

In the air bag device, it is desirable that when the degree of an impact, which is given to the driver/passenger, is small, the inflating (deploying) rate of the air bag is initially decreased, by which a small force is given to the driver when the driver is not in the regular seating position, and thereafter a large force is given to the driver/passenger so that the driver returns to the regular seating position, thus forming a cushion in front of the driver/passenger.

SUMMARY OF THE INVENTION

The object of the present invention is to provide, in a gas generator for an air bag system having two igniters, in which the deployment force of the bag can be adjusted or selected, a hybrid-type gas generator having a simpler structure that is easier to manufacture and to maintain high reliability as compared to the conventional gas generators. A gas generator for an air bag according to the present invention comprises a vessel having a pressurized gas accommodation chamber for accommodating a pressurized gas therein; a partition that divides the pressurized gas accommodation chamber into two sections; a through-hole, which is defined in the partition, for communicating the pressurized gas accommodation chamber sections; two ignition units having gas generating agents, respectively; and a gas release unit disposed in the pressurized gas accommodation chamber and having a rupturable gas sealing wall, wherein the two ignition units are disposed in the respective pressurized gas accommodation chamber sections one-by-one, or in any one of these pressurized gas accommodation chamber sections.

The structural characteristic of the gas generator of the present invention is that, the vessel is divided into two sections by a partition or a dividing wall, and connecting the sections by providing a through-hole (port). Further, a single igniter is disposed in each section, or two igniters are disposed in one of the two sections. The through-hole functions to equalize the pressure of the pressurized gas in the two sections. Therefore, the thorough-hole needs to have an area sufficient for the pressure of the filled gas in the sections to become equal.

The respective pressurized gas accommodation chamber sections may be different in volume from each other. Also, the respective gas generating agents of the two ignition units may be different in capacity from each other.

It is preferable that one of the pressurized gas accommodation chamber section is disposed in the center of the vessel whereas the other chamber section is disposed around the periphery of the one pressurized gas accommodation chamber section.

Also, it is preferable that the vessel is formed of a spherical body that combines two hemispherical bodies with one another, and the partition is formed of a plate body, which is held between the two hemispherical bodies, or formed of a plate body, which is disposed vertically with respect to the bottom surface of one of the hemispherical bodies.

The ignition unit may include an igniter accommodation vessel which is filled with an igniter material, a resistance heating body disposed within the igniter accommodation vessel, for heating upon receiving electricity, and a gas generating agent accommodation vessel, which surrounds the igniter accommodation vessel, for accommodating the gas generating agents therein.

In the gas generator of the present invention, two ignition units may operate simultaneously or with a time lag so that a generated gas pressure is adjusted, thereby changing the inflating (deploying) rate of the air bag.

When the degree of an impact is small, those two ignition units operate with a time lag, thereby decreasing the inflating rate of the air bag at an initial stage. As a result, a small force is applied to a driver/passenger who may not be in a regular seating posture, and a large force is thereafter applied to him so that he moves to the regular seating posture. Thus, a cushion can be formed in front of the driver.

Also, when the degree of an impact is large, those two ignition units operate simultaneously, thereby increasing the inflating rate of the air bag. As a result, the air bag is inflated rapidly, thereby forming a cushion in front of the driver.

The respective pressurized gas accommodation chamber selections may be identical with each other in volume, or alternatively the volumes of the respective accommodation chamber sections may be different from each other.

Moreover, the gas generating agents of the respective two ignition units may be identical with each other in capacity, or alternatively the amount of the gas generating agents may be different from each other.

In the case where the volumes of the pressurized gas accommodation chamber sections are different from each other, the inflating rate of the air bag can be changed at the initial stage by changing the order of the operation of the ignition units in the respective accommodation chamber sections. For example, in the case where the ignition unit in the accommodation chamber section having a larger volume is operated in advance, the inflating rate of the air bag at the initial stage is greater in comparison with the case where the ignition unit in the accommodation chamber section having a smaller volume is operated first.

The pressurized gas may be an inert gas, such as argon, nitrogen, helium, or the like. Those gases can be accommodated at a predetermined pressure, for example, 2510 to 5000 psi in the pressurized gas accommodation chamber.

As stated in the foregoing, the present invention realizes a gas generator for an air bag, in which the deployment speed of the bag can be varied. Namely, in the gas generator of the present invention (the pressurized chamber), containing pressurized gas therein, is divided into two sections by a partition, and the two sections are connected by the through-hole. Further, by providing two ignition units, the initial inflating (deploying) speed of the air bag is reduced to move the driver/passenger to a proper seating posture when the driver/passenger is not seated in the proper seating posture, and then applying a greater force to the passenger/driver and provide a cushion in front of the passenger. When the shock due to the collision is relatively large, the air bag is inflated at a greater speed, to inflate the air bag more quickly, to provide the cushion in front of the passenger to protect the passenger.

The gas generator of the present invention has a simpler structure, less number of parts, and therefore, easier and less expensive to manufacture.

DETAILED DESCRIPTION OF PREFERRED EMBODIMENTS

Figure 1:
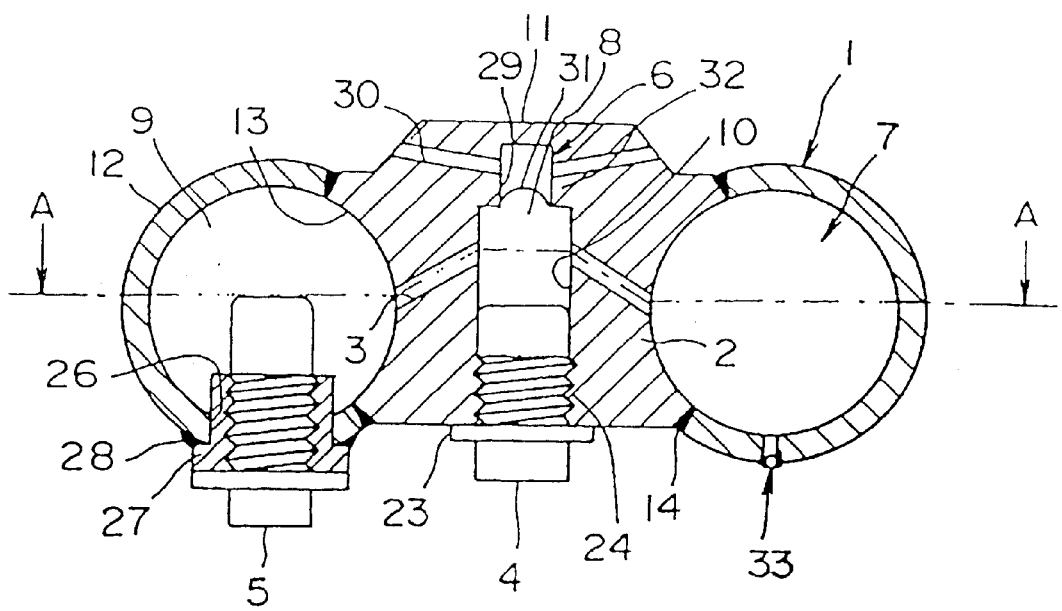
FIG. 1 is a cross-sectional view showing a gas generator for an air bag in accordance with an embodiment of the present invention.

Now, a description will be given in more detail of various preferred embodiments of the present invention with reference to the accompanying drawings. FIG. 1 is a cross-sectional view showing a gas generator for an air bag in accordance with an embodiment of the present invention. The gas generator includes a vessel 1, a partition 2, through-holes 3, two ignition units 4, 5, and a gas release unit 6.

Figure 2:
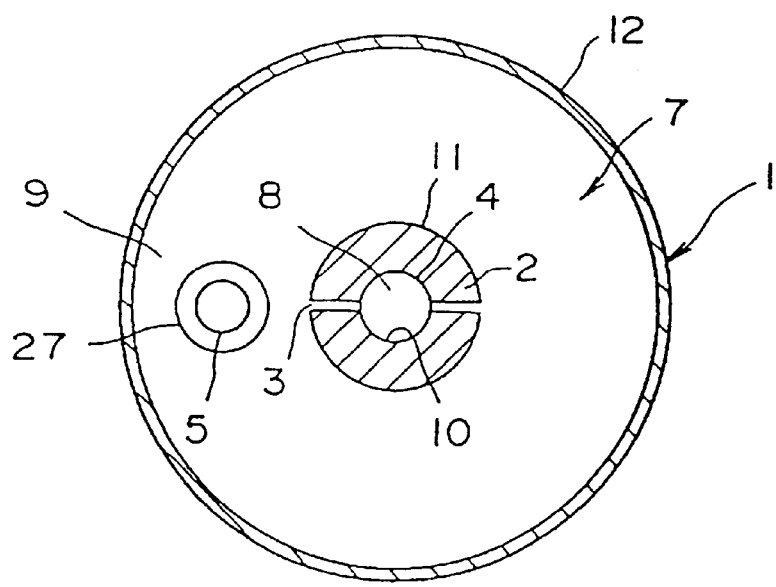
FIG. 2 is a cross-sectional view taken along a line II—II in FIG. 1.

The vessel 1 is circular in shape in a cross-sectional view as shown in FIG. 2, and includes a central portion 11 and a peripheral portion 12 surrounding the central portion 11. The central portion 11, in the cross-sectional view, has a circumferential groove 13 which is semicircular in a vertical section the outer periphery thereof, and the peripheral portion 12 is ring-shaped to be in a C-shape in a vertical section, which is fitted to the shape of the circumferential groove 13. Those peripheral portion 12 and circumferential groove 13 are put together and joined together by welding 14 to form the vessel 1. The vessel 1 may be made of aluminum alloy, stainless steel, or the like, and a pressurized gas accommodation chamber 7 is disposed inside of the vessel 1.

The pressurized gas accommodation chamber 7 is divided by the partition 2 into a first pressurized gas accommodation chamber section, that is, a first accommodation chamber section 8, and a second pressurized gas accommodation chamber section, that is, a second accommodation chamber section 9. The first accommodation chamber section 8 is formed of a circular hole portion 10 which is defined in the center of the central portion 11, and one end of the circular hole portion 10 is connected to the exterior of the vessel. The partition 2 is formed of the peripheral wall portion of the circular hole portion 10. The second accommodation chamber section 9 is disposed around the periphery of the first accommodation chamber section 8 with the partition 2 between them. The second accommodation chamber section 9 is formed of the circumferential groove 13 of the central portion 11 and the inner circumferential surface of the peripheral portion 12 to form an annular chamber in a radial section which is larger in volume than the first accommodation chamber section 8.

The through-holes 3 are defined in the partition 2 in the form of ports. The through-holes 3 communicate the first accommodation chamber section 8 with the second accommodation chamber section 9. Two through-holes 3 are provided opposite to each other, and each through-hole 3 extends radially and inclines downwardly from the first accommodation chamber section 8 toward the second accommodation chamber section 9.

The first ignition unit 4 is disposed in the first accommodation chamber section 8 whereas the second ignition unit 5 is disposed in the second accommodation chamber section 9.

Figure 3:
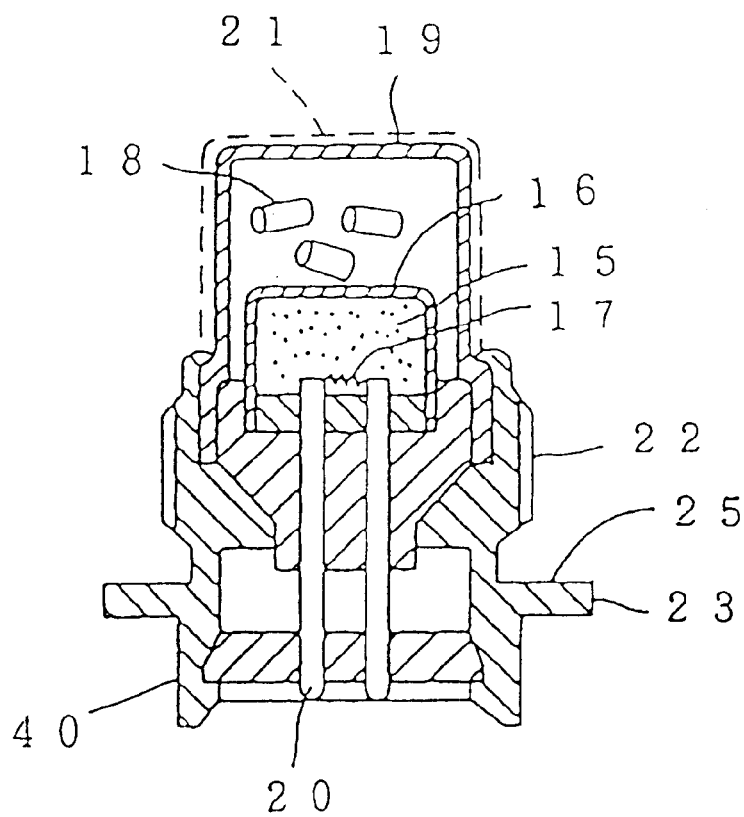
FIG. 3 is a cross-sectional view showing an ignition unit of the gas generator for an air bag in accordance with the present invention.

The ignition unit, as shown in FIG. 3, includes an igniter vessel 16, which is filled with an igniter material 15, a resistance heating body disposed in the vessel 16, that is, a NICHROME wire 17, a gas generating agent vessel 19 disposed around the igniter vessel 16 to accommodate therein the gas generating agents 18. The NICHROME wire 17 is, for example, 30 μm in diameter and connected to an electrical connector pin 20 to be heated by applying electricity. The igniter material may be made of, for example, a mixture of $KClO_4$ (potassium perchlorate) and Zr (zirconium). A black gunpowder can be provided within the gas generating agent vessel 19 instead of the gas generating agents, or together with the gas generating agents.

As indicated exemplarily by a dotted line in FIG. 3, a heat insulating cover 21 can be disposed outside of the gas generating agent vessel 19 to cover the vessel. The heat insulating cover 21 functions to prevent the gas generating agents inside the gas generating agent vessel 19 from being burned by heat of the gas generated by the operation of the other ignition unit.

A male screw thread 22 for fitting the ignition unit to the vessel 1 and a jaw 23 are formed in the outer periphery of a holder 40 of the ignition unit. The jaw 23 has a function of stopping the screw thread 22 from becoming loose. A female screw thread 24 is cut in the circular hole portion 10 and screwed with the male screw thread 22 of the first ignition unit 4. The first ignition unit 4 is connected to the central portion 11 of the vessel by the screw threads. A gasket can be disposed on a jaw end surface 25 of the ignition unit to ensure the sealing of the first accommodation chamber section 8. Alternatively, the first accommodation chamber section 8 may be sealed by welding instead of using the screw threads or the gasket. An opening 26 is defined in the lower portion of the peripheral portion 12, and a sleeve 27 is fixed to the opening 26 by welding 28, and the second ignition unit 5 is coupled to the sleeve 27 by screw threads.

The gas release unit 6 which is connected to the air bag is disposed in the first accommodation chamber section 8. The gas release unit 6 includes a circular hole portion 29 having one end connected to the first accommodation chamber section 8 and the other end closed, and being smaller in diameter than the circular hole portion 10, two branch paths 30 which are branched from the circular hole portion 29 and connected to the air bag (not shown), and a rupturable gas sealing wall 31 disposed at a step 32 formed between the circular hole portion 10 and the circular hole portion 29, for sealingly isolating both the hole portions 10 and 29 from each other. The gas sealing wall 31 may be made of, for example, a plate made of metal such as SUS316 (JIS standard symbol) or INCONEL and being 0.1 to 0.2 mm in thickness. In this case, the diameter of the circular hole portion 29 may be set to 8.0 mm. The outer peripheral portion of the gas sealing wall 31 is fixed together with a press-ring to the step 32 by welding.

Figure 4:
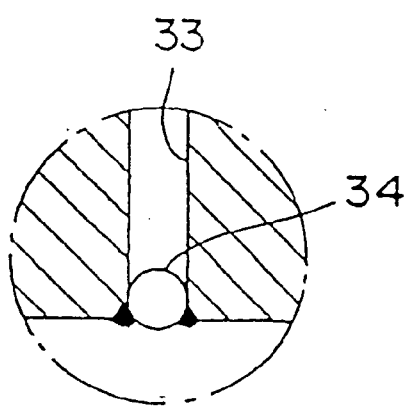
FIG. 4 is an enlarged cross-sectional view showing a gas filling hole of the gas generator for an air bag in accordance with the present invention.

The pressurized gas is filled into the pressurized gas accommodation chamber 7 from a through-hole defined at the lower side of the peripheral portion 12 of the vessel, that is, a gas filling hole 33. The gas filling hole 33, as shown in FIG. 4, is provided with a ball 34. According to a standard method, the gas is introduced through an introducing adapter attached to the gas filling hole 33 of the vessel. Then, the ball 34 is pushed into the hole 33 and welded by the electricity from the welding electrode. The gas introduced into the second accommodation chamber section 9 from the gas filling hole 33 passes through the through-holes 3 and into the first accommodation chamber section 8.

The gas generator of the present invention is operated as stated below by controlling the operation of the ignition unit.

(i) When the degree of an impact is small, two ignition units 4 and 5 are operated with a time lag.

In response to an electric signal from a control unit (not shown), the first ignition unit 4 is initially operated. In the ignition unit 4, when the NICHROME wire 17 is heated by electricity, the igniter material 15 is ignited and then burned, to thereby generate a gas with a high temperature and a high pressure. The gas breaks the wall of the vessel 16 and ignites the gas generating agents 18 outside thereof. As a result, the gas generating agents 18 are burned to thereby generate a gas with a high temperature and a high pressure. The gas breaks the wall 19 covering the gas generating agents and injects combusted gas within the first accommodation chamber section 8 outside thereof. The injected gas is mixed with the pressurized gas within the first accommodation chamber section 8 and heats the pressurized gas. The pressurized gas is inflated by heating, and a mixture of gases consisting of the inflated pressurized gas and the gas generated from the gas generating agents of the ignition unit ruptures the gas sealing wall 31 of the gas release unit and is injected within the air bag through the circular hole portion 29 and the branch paths 30. The air bag is inflated at a relatively low rate. As a result, the air bag can give a small force to the driver/passenger who is not at the regular seating posture.

A part of the gas flows into the second accommodation chamber section 9 through the through-holes 3 before the gas flows out. However, the gas does not burn the gas generating agents and the igniter material of the second ignition unit 5. Also, with the flow-out of the gas, the pressurized gas filled in the second accommodation chamber section 9 partially flows out from the through-holes 3. However, because the through-holes 3 limit the amount of gas flowing out from the second accommodation chamber 9, the through-holes have a diameter of a predetermined dimension, such that even though the second ignition means 5 is operated after 30 msec at the maximum, a required amount of the pressurized gas is ensured in the second accommodation chamber section 9.

In a predetermined time after the first igniter 4 is operated, an electric signal is supplied from the control unit to the second ignition unit 5, to thereby operate the second ignition unit 5. As a result, the igniter material and the gas generating agents in the second ignition unit 5 are burned to thereby generate a gas having a high temperature and a high pressure. The generated gas is mixed with the pressurized gas within the second accommodation chamber section 9, and also heats the pressurized gas. The mixture of gases including the pressurized gas inflated by heating and the gas generated by the gas generating agents of the ignition unit enters the first accommodation chamber section 8 through the through-holes 3, and then is injected in the air bag through the circular hole portion 29 and the branch paths 30. The second accommodation chamber section 9 has a larger volume than that of the first accommodation chamber section 8, and because the gas within the second accommodation chamber section is newly added to the air bag, the inflating rate of the air bag is thereafter increased. As a result, the air bag applies a large force to the driver/passenger who is not at the regular seating posture so that he returns to the regular seating posture, thus forming a cushion in front of the driver.

(ii) When the degree of a collision is large, the ignition units 4 and 5 are operated simultaneously.

In response to an electric signal from the control unit, the first and second ignition units 4 and 5 are operated simultaneously, with the result that the mixture of gases is generated simultaneously in the first and second accommodation chamber sections 8 and 9. The mixture of gases in the first accommodation chamber section 8 is injected into the air bag through the circular hole portion 29 and the branch paths 30, whereas the mixture of gases in the second accommodation chamber section 9 is injected into the air bag through the through-holes 3, the first accommodation chamber section 8, the circular hole portion 29, and the branch paths 30. As a result, the air bag receives the mixture of gases generated simultaneously in the two accommodation chamber sections to be rapidly inflated, thereby forming a cushion in front of the driver.

EXAMPLE

An experiment was conducted using the gas generator shown in FIG. 1 under the following conditions.

CONDITIONS

The volume of the first accommodation chamber section: 30 ml.

The volume of the second accommodation chamber section: 50 ml.

Pressurized gas: A mixture of gases consisting of argon 75%, oxygen 20%, and helium 5% is filled under a pressure Of 4000 psi (280 kg/cm$^3$).

Gas tight-sealing wall: A stainless steel having 0.2 mm thickness is TIG-welded.

The first ignition unit: a mixture 100 mg of $KClO_4$ and Zr as the igniter material and nitramine powder product 3.2 gr as the gas generating agents.

The second ignition unit: a mixture 100 mg of $KClO_4$ and Zr as the igniter material and nitramine powder product 1.2 gr as the gas generating agents.

The through-holes: 4 holes each having 3.0 mm diameter.

Figure 5:
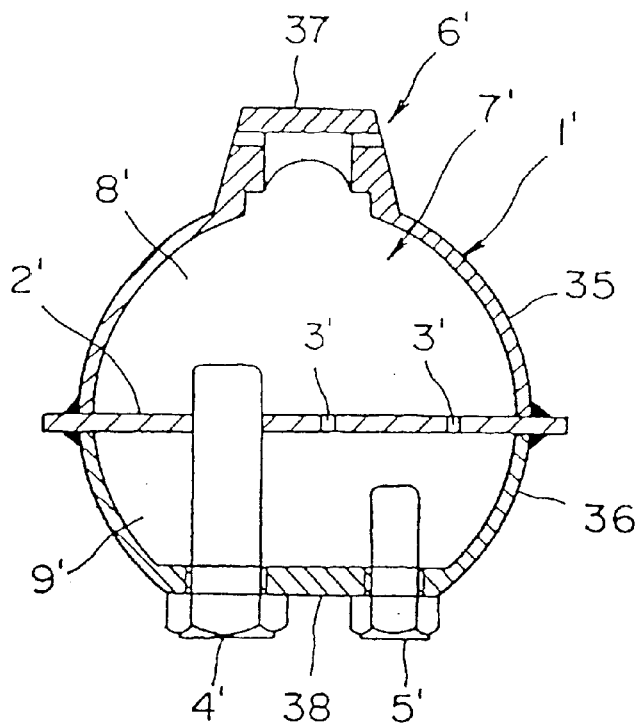
FIG. 5 is a cross-sectional view showing a gas generator for an air bag in accordance with another embodiment of the present invention.

FIG. 5 shows a gas generator in accordance with another embodiment of the present invention. The gas generator includes a vessel 1', a partition 2', through-holes 3', two ignition units 4' and 5', and gas release unit 6'. The vessel 1' is made of a spherical body that includes two hemispherical bodies 35 and 36 combined with one another, and the partition 2' is formed of a circular plate body held between the two hemispherical bodies. The partition 2' divides the pressurized gas accommodation chamber 7' within the vessel into two sections, that is, a first accommodation chamber section 8' and a second accommodation chamber section 9'.

A hollow conical shaped top 37 is formed on the hemispherical body 35, and a planar bottom 38 is formed on the hemispherical body 36. The gas release unit 6' is disposed in the top 37, and two ignition units 4' and 5' are disposed in the planar bottom 38. The first ignition unit 4' is so designed that its gas generating portion passes through the second accommodation chamber section 9' and positions within the first accommodation chamber section 8' to be operative on the pressurized gas within the first accommodation chamber section 8'. The second ignition unit 5' is disposed in the second accommodation chamber section 9'. A difference in volume between those two accommodation chamber sections 8' and 9' is not so large in comparison with that in FIG. 1, but the first accommodation chamber section 8' is slightly larger in volume than the second accommodation chamber section 9'.

Figure 6:
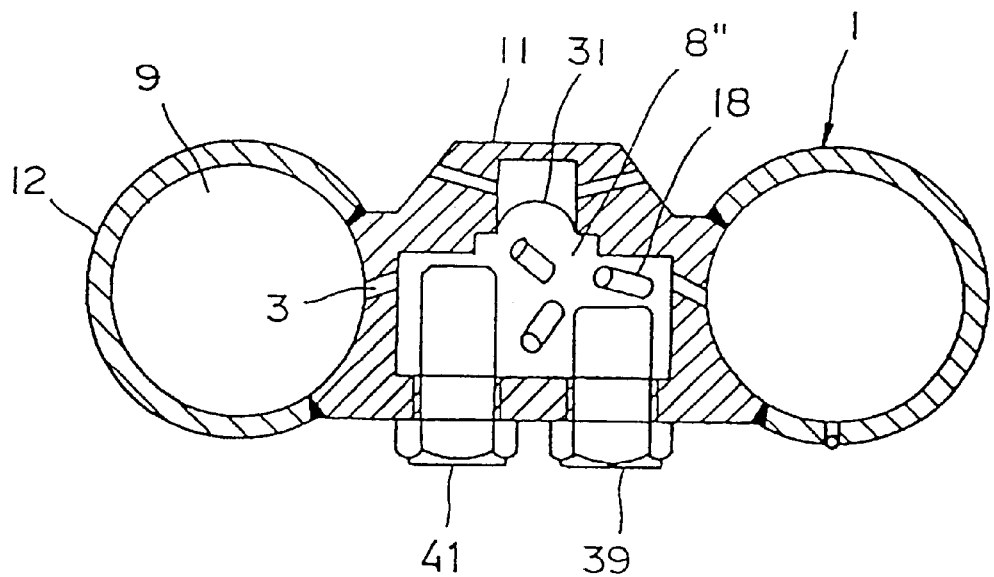
FIG. 6 is a cross-sectional view showing a gas generator for an air bag in accordance with still another embodiment of the present invention.

FIG. 6 is a gas generator in accordance with still another embodiment of the present invention. The gas generator is different from that in FIG. 1 in that the volume of a first accommodation chamber 8" is larger, and the two ignition units 39 and 41 are disposed in one of the pressurized gas accommodation chamber sections, that is, the first accommodation chamber section 8". The structural elements identical with those in FIG. 1 are represented by the same symbols, and their descriptions will be omitted.

An ignition unit 39 includes gas generating agents 18' outside the ignition unit 39, which is different from the ignition unit shown in FIG. 3. The second ignition unit 41 is identical with the one in FIG. 3 and contains a large quantity of gas generating agents 18 as shown in FIG. 3. The second ignition unit 41 also has the heat insulating cover 21 of FIG. 3. With the operation of the ignition unit 39, the gas generating agents 18' are burned to generate a gas with a high temperature and a high pressure, then the gas is mixed with the pressurized gas within the first accommodation chamber section 8", to thereby heat the pressurized gas. The pressurized gas is inflated by heating, and a mixture of gases consisting of the inflated pressurized gas and the combustion gas generated by the combustion of the gas generating agents ruptures the gas tight sealing wall 31 of the gas release unit so that the gas is injected into the air bag. As a result, the air bag is inflated at a relatively low rate. With the flow-out of the mixture of gases, the pressurized gas flows from the second accommodation chamber section 9 to the first accommodation chamber section 8" through the through-holes 3. The pressurized gas thus flowing in is treated by the other ignition unit 41 that operates with a time lag, and then inflated. The inflated gas is injected into the air bag through the passage of the gas release unit, with the results that the air bag is inflated with an increased rate, to thereby form a cushion in front of the driver.

When two ignition units 39 and 41 are operated simultaneously, the burning rates of the gas generating agents 18, 18' are increased in comparison with a case where one ignition unit 39 is operated, whereby a gas higher in pressure and temperature is generated at the initial stage. As a result, the air bag is rapidly inflated from the initial stage.

Figure 7:
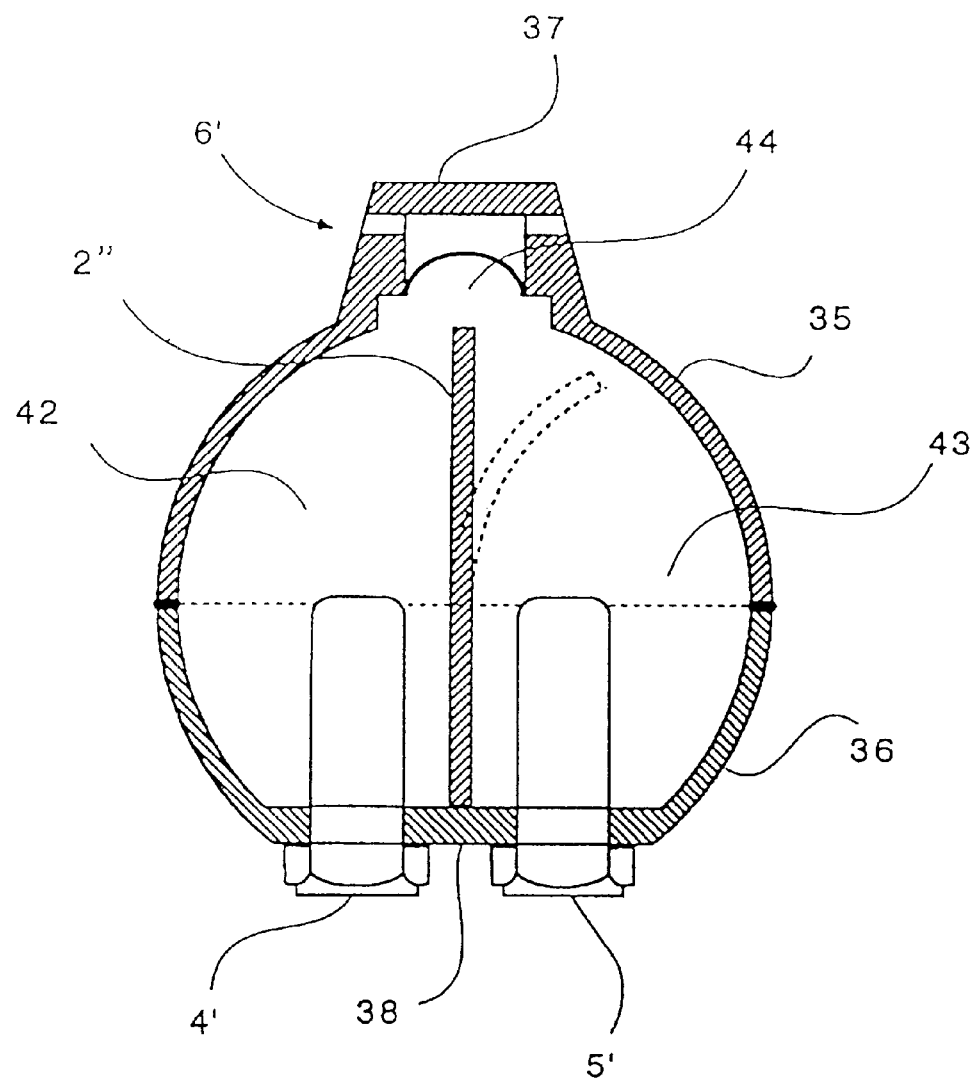
FIG. 7 is a cross-sectional view showing a gas generator for an air bag in accordance with yet another embodiment of the present invention.

FIG. 7 shows yet another embodiment of the present invention, which corresponds to a variation of the embodiment shown in FIG. 5. In FIG. 7, a spherical body is formed by combining a pair of hemispherical bodies 35 and 36. A partition 2" is disposed vertically on a planar bottom 38 of the hemispherical body 36. The partition 2" divides the internal chamber of the spherical body into a first accommodation chamber section 42, which accommodates an igniter 4', and a second accommodation chamber section 43, which accommodates an igniter 5'. The first and second accommodation chambers 42 and 43 are connected by a gap 44 defined by one end of the partition 2" and an inner surface and/or a gas sealing wall. In FIG. 7, when the partition 2" is disposed as shown in dotted lines, the volume of the first accommodation chamber section 42 can be changed with respect to the second accommodation chamber section 43.

What is claimed is:

1. A gas generator for an air bag, comprising:
   a vessel having a pressurized gas accommodation chamber for accommodating a pressurized gas therein;
   a partition made of a single piece of material provided independently from a peripheral portion of said vessel and dividing said pressurized gas accommodation chamber into two sections, said partition defining one of said two sections therein and having at least one receiving portion for receiving at least one ignition unit;
   a through-hole, defined in said partition, for communicating the sections of the pressurized gas accommodation chamber, said through-hole constantly maintaining communication between said two sections regardless of an operating condition of the gas generator;
   two ignition units, each ignition unit containing an igniter material and gas generating agents that generate gas when ignited by the igniter material, at least one of said two ignition units being attached directly to said receiving portion; and
   a gas release unit adapted to release gas from said vessel, said gas release unit having only a single rupturable gas sealing wall that seals an entire pressurized gas inside said vessel.

2. A gas generator for an air bag as claimed in claim 1, wherein said through-hole, which communicates said sections, is a port provided in said partition.

3. A gas generator for an air bag as claimed in claim 1, wherein said sections are different in volume from each other.

4. A gas generator for an air bag as claimed in claim 1, wherein one of said two sections is disposed in the center of the vessel whereas the other thereof is disposed around the periphery of said one of said two sections.

5. A gas generator for an air bag as claimed in claim 1, wherein each of said ignition units includes an igniter material accommodation vessel which is filled with the igniter material, a resistance heating body disposed within said igniter material accommodation vessel, for heating upon receiving an electricity, and a gas generating agent accommodation vessel surrounding said igniter accommodation vessel, for accommodating the gas generating agents therein, wherein at least one of said two ignition units has a heat insulating cover.

6. The gas generator of claim 1, wherein
one of said two ignition units is disposed in one of said sections and the other of said two ignition units is disposed in the other of said sections.

7. The gas generator of claim 1, wherein the pressurized gas includes about 75% of argon, about 20% of oxygen, and about 5% of helium.

8. A gas generator for an air bag, comprising:
a vessel having a pressurized gas accommodation chamber for accommodating a pressurized gas therein;

a partition made of a single piece of material provided independently from a peripheral portion of said vessel and dividing said pressurized gas accommodation chamber into two sections, said partition defining one of said two sections therein and having at least one receiving portion for receiving at least one ignition unit;

a through-hole, defined in said partition, for communicating the sections of the pressurized gas accommodation chamber, said through-hole constantly maintaining communication between said two sections regardless of an operating condition of the gas generator;

a first ignition unit provided in one of said two sections containing a first igniter material and first gas generating agents that generate combustion gas when ignited by the first igniter material, said first ignition unit being attached directly to said receiving portion;

a second ignition unit provided in the other of said two sections and containing a second igniter material and second gas generating agents that generate combustion gas when ignited by the second igniter material; and a gas release unit adapted to release gas from said vessel, said gas release unit having only a single rupturable gas sealing wall that seals an entire pressurized gas inside said vessel, wherein the amount of said first gas generating agents is different from the amount of said second gas generating agents.

9. The gas generator of claim 8, wherein the pressurized gas includes about 75% of argon, about 20% of oxygen, and about 5% of helium.

* * * * *